United States Patent
Fan et al.

(10) Patent No.: US 12,149,117 B1
(45) Date of Patent: Nov. 19, 2024

(54) ENERGY-SAVING OPERATION AND CONTROL METHOD FOR UPS

(71) Applicant: Fanshi Technology Development Co., Ltd., Shanxi (CN)

(72) Inventors: Feng Fan, Shanxi (CN); Haoming Fan, Taiyuan (CN)

( * ) Notice: Subject to any disclaimer, the term of this patent is extended or adjusted under 35 U.S.C. 154(b) by 0 days.

(21) Appl. No.: 18/625,958

(22) Filed: Apr. 3, 2024

(51) Int. Cl.
| H02J 9/06 | (2006.01) |
| H01M 10/44 | (2006.01) |
| H01M 10/48 | (2006.01) |
| H02J 7/00 | (2006.01) |

(52) U.S. Cl.
CPC .............. H02J 9/06 (2013.01); H01M 10/44 (2013.01); H01M 10/48 (2013.01); H02J 7/0013 (2013.01); H02J 7/0048 (2020.01); H02J 7/00712 (2020.01)

(58) Field of Classification Search
CPC .......... H02J 9/06; H02J 7/0013; H02J 7/0048; H02J 7/00712; H01M 10/44; H01M 10/48
See application file for complete search history.

(56) References Cited

U.S. PATENT DOCUMENTS

| 6,100,605 A * | 8/2000 | Zjakowski | H02J 9/06 307/66 |
| 6,507,168 B1 * | 1/2003 | Matsuda | H02J 9/062 320/103 |
| 2001/0045778 A1 * | 11/2001 | Ando | H01M 10/48 307/66 |
| 2011/0156482 A1 * | 6/2011 | Yang | H02J 9/06 307/66 |
| 2016/0012706 A1 * | 1/2016 | Bi | H02J 7/005 340/636.1 |
| 2017/0093207 A1 * | 3/2017 | Park | H02J 9/061 |
| 2018/0205121 A1 * | 7/2018 | Chiang | G01R 31/367 |
| 2019/0089181 A1 * | 3/2019 | Toyoda | H02J 9/062 |
| 2020/0058965 A1 * | 2/2020 | Kim | H01M 10/4207 |
| 2020/0083735 A1 * | 3/2020 | Wan | H02J 9/061 |
| 2020/0235604 A1 * | 7/2020 | Lee | G01R 31/3835 |
| 2022/0006313 A1 * | 1/2022 | Lim | H01M 10/486 |
| 2023/0074135 A1 * | 3/2023 | Shih | H02J 7/0068 |
| 2024/0055886 A1 * | 2/2024 | Kumamoto | H02J 7/0025 |

* cited by examiner

Primary Examiner — Daniel Kessie
Assistant Examiner — Brian K Baxter

(57) ABSTRACT

An energy-saving operation and control method for a UPS. The method includes performing a concomitant detection on a self-discharge condition of the UPS without any further processing before the concomitant detection, to obtain an automatic discharging amount per unit of time when the battery is in an un-operating state; determining a replacement timing among three kinds according to a value of the discharging amount; and generating a replacement signal at a corresponding time point according to the replacement timing; according to the generated replacement signal, performing a process of power charging and power discharging on the battery.

4 Claims, 1 Drawing Sheet

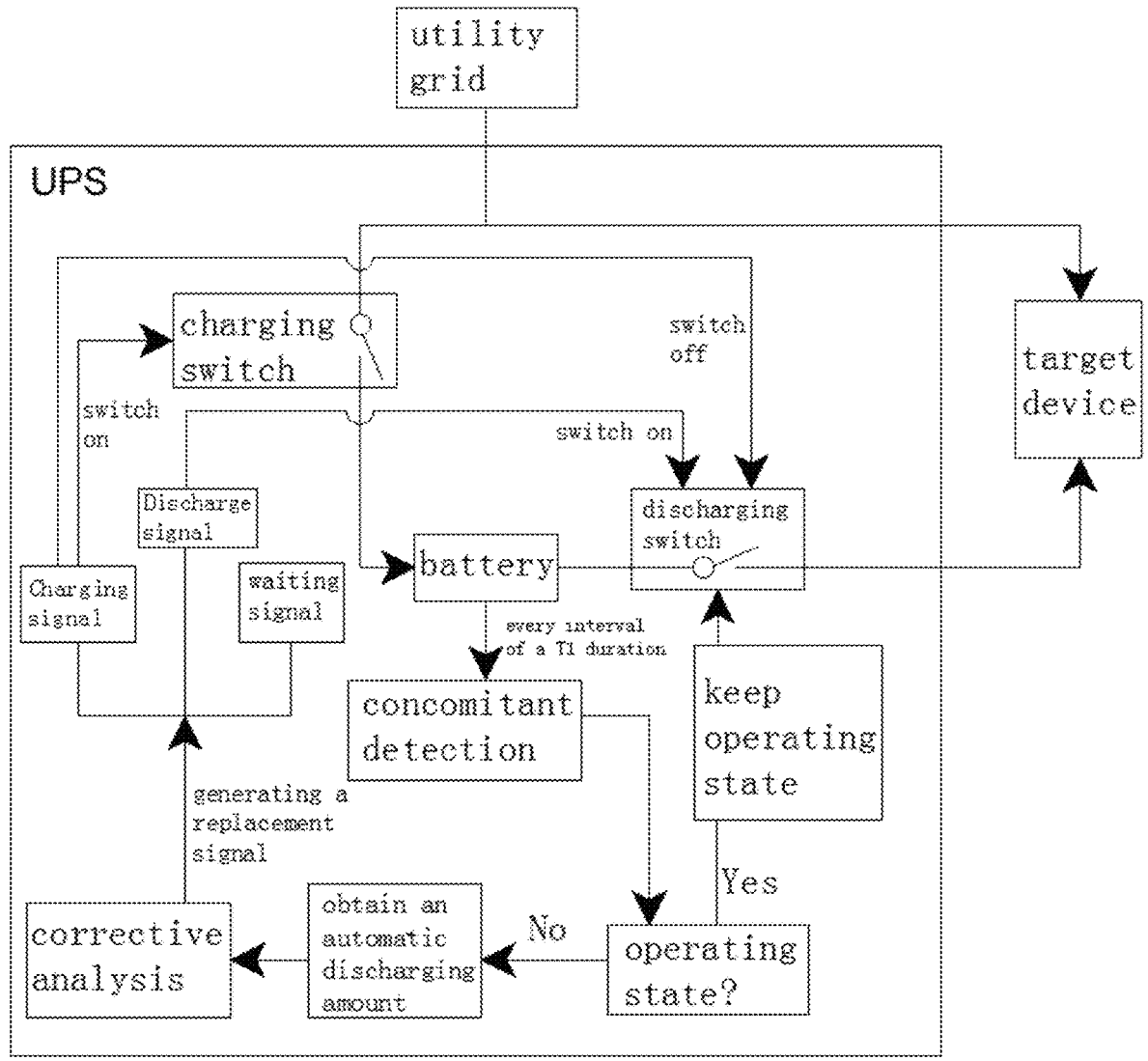

ENERGY-SAVING OPERATION AND CONTROL METHOD FOR UPS

TECHNICAL FIELD

The present disclosure relates to the technical field of UPS energy-saving operations, and more specifically to an energy-saving operation and control method for a UPS.

BACKGROUND

CN Patent No. CN104795882A discloses an energy saving control method and system for a UPS, the UPS including multiple UPS units, and each of UPS unit including at least one power processing module. The control method includes the following steps during operation of the UPS: causing the UPS to operate in an ECO mode when a current operating condition of the UPS satisfies a preset condition; and causing the UPS to operate in a normal mode when the current operating condition of the UPS does not satisfy the preset condition. This Patent automatically switches between the ECO mode and the normal mode according to the current operating condition during the operation of the USP system, thereby ensuring a reliable operation of the system, maximizing energy savings, and improving the operating efficiency of the UPS, such that the system can meet requirements for an optimized operating efficiency in different operating environments.

However, for the UPS, the battery may be under a discharge process when not in use. This process occurs with many reasons. Nevertheless, when this process lasts for a long time, it will result in wasted power. In response to this technical problem, the present disclosure aims to provide a technical solution.

SUMMARY OF THE DISCLOSURE

The present disclosure aims to solve at least one of the technical problems existing in the prior art; to this end, the present disclosure proposes an energy-saving operation and control method for a UPS.

An energy-saving operation and control method for an uninterruptable power system (UPS), including:

Step 1: obtaining an operating state of a battery in the UPS;

Step 2: performing a concomitant detection on a self-discharge condition of the UPS without any further processing before the concomitant detection, to obtain an automatic discharging amount per unit of time when the battery is in an un-operating state; determining a replacement timing among three kinds according to a value of the discharging amount; and generating a replacement signal at a corresponding time point according to the replacement timing;

Step 3: repeating the Step 2 every interval of a T1 duration to redefine a generation timing of the replacement signal, wherein T1 is a preset value; and Step 4: according to the generated replacement signal, performing a process of power charging and power discharging on the battery; wherein the power discharging causes a power of the battery to be supplied to a target device, and the power charging is performed in response to the power discharging being finished.

In some embodiments, the concomitant detection in the Step 2 is implemented by:

S1: after the battery of the UPS is in a fully-charged state, detecting a real-time power of the battery and obtaining a real-time ratio of the real-time power to a power capacity of the battery, and marking the real-time ratio as a remaining ratio.

S2: observing the remaining ratio in real time when the battery is in the un-operating state; automatically obtaining a real-time remaining ratio after observing the remaining ratio in real time continuously for X1 days, and subtracting the real-time remaining ratio from 1 to obtain an attenuation ratio; wherein X1 is a preset value.

S3: dividing the attenuation ratio by X1 to obtain an attenuation amplitude value;

S4: obtaining a real-time value of the attenuation ratio in response to satisfying: the attenuation amplitude value >X2; and generating a replacement signal in response to the real-time value of the attenuation ratio exceeding 0.85 times α; wherein α is a preset value;

obtaining a real-time value of the attenuation ratio in response to satisfying: X3 ≤the attenuation amplitude value ≤X2; and generating a replacement signal in response to the attenuation ratio exceeding α; wherein α is a preset value; and obtaining a real-time value of the attenuation ratio in response to satisfying: the attenuation amplitude value ≤X3; and generating a replacement signal in response to the attenuation ratio exceeding 1.2 times α; wherein α is a preset value, and X3 is a preset value; and S5: obtaining the generated replacement signal.

In some embodiments, before the Step 4, a corrective analysis is performed, which is implemented by:

S01: obtaining a line on which the UPS is located, and marking the line as a subject line;

S02: obtaining all abnormal time points of the subject line; wherein the abnormal time points refer to time points in which abnormalities occur in the subject line in past two years;

S03: labeling the abnormal time points as Yi, i=1 ... n, which indicates that n abnormalities occur in the subject line in the past two years; wherein the abnormal time points Yi are sequentially ordered from a furthest time;

S04: sequentially obtaining a time interval between each neighboring two of the abnormal time points Yi to obtain all the time intervals, and labelling the time intervals as neighboring interval values Gi, i=1 ... n−1;

S05: automatically obtaining a mean value of the neighboring interval values Gi, and labelling the mean value as a neighboring interval mean value P; automatically calculating and obtaining an aggregation degree D of the neighboring interval values Gi by the following formula:

$$D = \frac{1}{n-1} \times \sum_{i=1}^{n-1} |G_i - P|$$

where |*| indicates that an absolute value is taken for a value in parentheses;

S06: in response to the aggregation degree D being less than or equal to X4, automatically marking the mean value as an indirectly fixed value; in response to the aggregation degree D being greater than X4, proceeding to S07;

S07: automatically ordering the neighboring interval values Gi in accordance with $|G_i-P|$ from maximum to minimum; selecting a neighboring interval value Gi in sequential order and automatically deleting the selected neighboring interval value Gi, and recalculating the aggregation degree D after deleting the selected neighboring interval value Gi; in response to the aggregation degree D being still greater than X4, selecting a next neighboring interval value Gi in sequential order and automatically deleting the selected neighboring interval value Gi, and recalculating the aggregation degree D after deleting the selected neighboring interval value Gi; repeating the above operations until the aggregation degree D is less than or equal to X4; obtain the mean value of the neighboring interval values Gi corresponding to the aggregation degree D being less than or equal to X4, and marking the mean value as an indirectly fixed value;

S08: obtaining a last abnormal time point before the generation timing of the replacement signal, adding the last abnormal time point to the indirectly fixed value from the S06 or S07 to obtain a time point, and marking the time point as a predicted occurrence time; and S09: in response to a time difference between the predicted occurrence time and the generation timing of the replacement signal being within a T2 duration, automatically generating a waiting signal; and after the predicted occurrence time is reached, and the T2 duration is further passed, performing the process of power charging and power discharging on the battery; in response to the time difference between the predicted occurrence time and a generation time of the replacement signal being greater than the T2 duration, directly performing the process of power charging and power discharging on the battery.

In some embodiments, the performing a process of power charging and power discharging on the battery in the Step 4 is implemented by:

in response to the replacement signal being generated, automatically switching a circuit controlled by the UPS to be energized by the battery; after the battery is finished in power discharging, switching the circuit controlled by the UPS to be energized by a utility grid, and simultaneously charging the battery for another time.

In some embodiments, the battery includes a plurality of battery units, and the performing a process of power charging and power discharging on the battery in the Step 4 is implemented by:

in response to the replacement signal being generated, automatically obtaining a recent power consumption per unit time of an object energized by the subject line, and labelling the recent power consumption per unit time as a subject unit consumption; wherein the subject line is supported by the UPS;

multiplying the subject unit consumption by a set duration to obtain a minimum guaranteed power;

in response to a total remaining power of some of the plurality of battery units in the battery being greater than or equal to the minimum guaranteed power, marking a number of the some of the plurality of battery units as a guaranteed number;

obtaining a total number of all the plurality of battery units in the battery, subtracting the guaranteed number from the total number to obtain a value, and labelling the value as a replacement number;

automatically switching a circuit controlled by the UPS to be energized by the battery; after some of the plurality of battery units, a number of which is the replacement number, are finished in power discharging, switching the circuit controlled by the UPS to be energized by a utility grid, and simultaneously charging the some of the plurality of battery units for another time; and automatically switching the circuit controlled by the UPS back to be energized by the battery, with some of the plurality of battery units, the number of which is the guaranteed number, being retained; wherein the some of the plurality of battery units include battery units that have been charged for another time; and performing the process of power charging and power discharging on remaining battery units in the battery, until all the plurality of battery units in the battery are subjected to the process of power charging and power discharging.

The beneficial effects of the present disclosure compared to the related art include the following.

The present disclosure provides an energy-saving operation and control method for a UPS, related to the technical field of UPS energy-saving operations. The method includes performing a concomitant detection on a self-discharge condition of the UPS without any further processing before the concomitant detection, to obtain an automatic discharging amount per unit of time when the battery is in an un-operating state; determining a replacement timing among three kinds according to a value of the discharging amount; and generating a replacement signal at a corresponding time point according to the replacement timing; according to the generated replacement signal, performing a process of power charging and power discharging on the battery. In this way, power can be supplied to the user from the UPS battery at the right time before a next replenishment, thereby avoiding wasted power, which is simple, effective, and easy to implement.

BRIEF DESCRIPTION OF DRAWING

The solo FIGURE is a structural diagram of the present invention.

DETAILED DESCRIPTION

The technical solution of the present disclosure will be described clearly and completely in the following in connection with embodiments with reference to the solo FIGURE, and it is obvious that the described embodiments are only a part of the embodiments of the present disclosure but not all of them. Based on the embodiments in the present disclosure, all other embodiments obtained by those skilled in the art without making creative labor fall within the scope of the present disclosure.

As an Embodiment I of the present disclosure, on the basis of not considering the issue of the number of UPS batteries, when only one group of batteries exists, the present disclosure firstly provides an energy-saving operation and control method for an uninterruptable power system (UPS), which specifically includes the following steps.

Step 1: obtaining an operating state of a battery in the UPS;

Step 2: performing a concomitant detection on a self-discharge condition of the UPS without any further processing before the concomitant detection, where the concomitant detection is implemented in the following specific manner.

S1: after the battery of the UPS is in a fully-charged state, detecting a real-time power of the battery and obtaining a real-time ratio of the real-time power (remaining power) to a power capacity of the battery, and marking the real-time ratio as a remaining ratio.

S2: observing the remaining ratio in real time when the battery is in an un-operating state; automatically obtaining a real-time remaining ratio after observing the remaining ratio in real time continuously for X1 days, and subtracting the real-time remaining ratio from 1 to obtain an attenuation ratio; where the X1 is a preset value.

S3: dividing the attenuation ratio by X1 to obtain an attenuation amplitude value;

S4: obtaining a real-time value of the attenuation ratio when the attenuation amplitude value exceeds X2; and generating a replacement signal when the real-time value of the attenuation ratio exceeds 0.85 times α; wherein α is a preset value;

obtaining a real-time value of the attenuation ratio when X3≤attenuation amplitude value ≤X2; and generating a replacement signal when the attenuation ratio exceeds α; wherein α is a preset value; and obtaining a real-time value of the attenuation ratio when attenuation amplitude value ≤X3; and generating a replacement signal when the attenuation ratio exceeds 1.2 times α; wherein α is a preset value, and X3 is a preset value.

S5: obtaining the generated replacement signal.

Step 3: repeating the step 2 every interval of a T1 duration to redefine a generation timing of the replacement signal, where T1 is a preset value, which may generally be valued at half a year, and of course be set to other values.

Step 4: according to the generated replacement signal, performing a process of power charging and power discharging of the UPS battery in a specific manner:

when the replacement signal is generated, automatically switching a circuit controlled by the UPS to be energized by the UPS battery; after the UPS battery is finished in power discharging, switching the circuit controlled by the UPS to be energized by a utility grid, and simultaneously charging the UPS battery for another time.

As an Embodiment II of the present disclosure, the technical solution provided in this embodiment differs from the Embodiment I in the following.

Regarding the battery for a single or consistency power replacement, another problem is needed to consider that: when the utility grid is power cut after the completion of the power discharge of the battery, the UPS battery cannot continue to supply power to the target device. Therefore, before the step 4 to produce the replacement signal for the process of power charging and power discharging of the UPS battery, a corrective analysis is required to be performed, which is implemented in the following specific manner.

S01: obtaining a line on which the UPS is located, and marking the line as a subject line.

S02: obtaining all abnormal time points of the subject line, where the abnormal time points are referred to as time points in which abnormalities occurred in the subject line in past two years.

S03: labeling the abnormal time points as Yi, i=1 ... n, which indicates that n abnormalities occur in the subject line in the past two years; where the Yi is sequentially ordered from a furthest time.

S04: sequentially obtaining a time interval between each neighboring two of the abnormal time points Yi to obtain all the time intervals, and labelling the time intervals as neighboring interval values Gi, i=1 ... n−1;

S05: automatically obtaining a mean value of the neighboring interval values Gi, and labelling the mean value as a neighboring interval mean value P; automatically calculating and obtaining an aggregation degree D of the neighboring interval values Gi by the following formula:

$$D = \frac{1}{n-1} \times \sum_{i=1}^{n-1} |G_i - P|$$

where |*| indicates that the absolute value is taken for the value in parentheses;

S06: when the aggregation degree D is less than or equal to X4, automatically marking the mean value as an indirectly fixed value; when the aggregation degree D is greater than X4, proceeding to the following.

S07: automatically ordering the neighboring interval values Gi in accordance with |$G_i$−P| from maximum to minimum; selecting a neighboring interval value Gi in sequential order and automatically deleting the selected neighboring interval value Gi, and recalculating the aggregation degree D after deleting the selected neighboring interval value Gi; when the aggregation degree D is still greater than X4, selecting a next neighboring interval value Gi in sequential order and automatically deleting the selected neighboring interval value Gi, and recalculating the aggregation degree D after deleting the selected neighboring interval value Gi; repeating the above operations until the aggregation degree D is less than or equal to X4; obtain the mean value of the neighboring interval values Gi corresponding to the aggregation degree D, and marking the mean value as an indirectly fixed value;

S08: obtaining a last abnormal time point before the replacement signal is generated, adding the abnormal time point to the indirectly fixed value to obtain a time point, and marking the time point obtained as a predicted occurrence time.

S09: when a time difference between the predicted occurrence time and a generation time of the replacement signal is within a T2 duration, automatically generating a waiting signal; and after the predicted occurrence time is reached, and the T2 duration is further passed, performing the process of power charging and power discharging of the UPS battery; when the time difference between the predicted occurrence time and a generation time of the replacement signal is greater than the T2 duration, directly performing the process of power charging and power discharging of the UPS battery.

As an Embodiment III of the present disclosure, on the basis of considering the issue of the number of UPS batteries, the difference between this embodiment and the Embodiment I is that the process of power charging and power discharging of the UPS battery in the step 4 is not the same, which specifically includes the following steps:

when the replacement signal is generated, automatically obtaining a recent power consumption per unit time of an object energized by the subject line, and labelling the power consumption per unit time as a subject unit consumption, where the subject line is a line supported by the UPS;

multiplying the subject unit consumption by a set duration to obtain a minimum guaranteed power;

obtaining the battery group; when a total remaining power of some batteries in the battery group is greater than or equal to the minimum guaranteed power, marking a number of the some batteries as a guaranteed number;

obtaining a total number of all the batteries in the battery group, subtracting the guaranteed number from the total number to obtain a value, labelling the value as a replacement number;

automatically switching the circuit controlled by the UPS to be energized by the battery group; after some batteries in the battery group, the number of which is the replacement number, are power discharged, switching the circuit controlled by the UPS to be energized by the utility grid, and simultaneously charging the some batteries for another time.

automatically switching the circuit controlled by the UPS back to be energized by the battery group, with some batteries in the battery group, the number of which is the guaranteed number, being retained; preferably, the some batteries in the battery group include the batteries that have been charged for another time; performing the process of power charging and power discharging on remaining batteries in the battery group, until all the batteries in the battery group are subjected to the process of power charging and power discharging.

Some of data in the above formula are calculated by removing the scale and taking its value, and the formula is adjusted to be closest to the real situation by software simulation using a large amount of collected data; the preset parameters and preset thresholds in the formula are set by those skilled in the art according to the actual situation or obtained by simulation of a large amount of data.

The above embodiments are only intended to illustrate the technical method of the present disclosure rather than to limit the same. Although the present disclosure is described in detail with reference to the above embodiments, those skill in the art should understand that modifications or equivalent replacements can be made to the technical method in the present disclosure without departing from the spirit and scope of the technical method in the present disclosure.

What is claimed is:

1. An energy-saving operation and control method for an uninterruptable power system (UPS), comprising:

Step 1: obtaining an operating state of a battery in the UPS;

Step 2: performing a concomitant detection on a self-discharge condition of the UPS without any further processing before the concomitant detection, to obtain an automatic discharging amount per unit of time when the battery is in an un-operating state; determining three kinds of replacement timing according to a value of the automatic discharging amount; and generating three replacement signals at corresponding time points of the three kinds of replacement timing;

Step 3: repeating the Step 2 every interval of a T1 duration to redefine a generation timing of the replacement signals, wherein T1 is a preset value; and Step 4: according to the generated replacement signals, performing a process of power charging and power discharging on the battery; wherein the power discharging causes a power of the battery to be supplied to a target device, and the power charging is performed in response to the power discharging being finished; before the Step 4, a corrective analysis is performed, which is implemented by:

S01: obtaining a line on which the UPS is located, and marking the line as a subject line;

S02: obtaining all abnormal time points of the subject line; wherein the abnormal time points refer to time points in which abnormalities occur in the subject line in past two years;

S03: labeling the abnormal time points as Yi, i=1 ... n, which indicates that n abnormalities occur in the subject line in the past two years; wherein the abnormal time points Yi are sequentially ordered from a furthest time;

S04: sequentially obtaining a time interval between each neighboring two of the abnormal time points Yi to obtain all the time intervals, and labelling the time intervals as neighboring interval values Gi, i=1 ... n−1;

S05: automatically obtaining a mean value of the neighboring interval values Gi, and labelling the mean value as a neighboring interval mean value P; automatically calculating and obtaining an aggregation degree D of the neighboring interval values Gi by the following formula:

$$D = \frac{1}{n-1} \times \sum_{i=1}^{n-1} |G_i - P|$$

where |*| indicates that an absolute value is taken for a value in parentheses;

S06: in response to the aggregation degree D being less than or equal to X4, automatically marking the mean value as an indirectly fixed value; in response to the aggregation degree D being greater than X4, proceeding to S07;

S07: automatically ordering the neighboring interval values Gi in accordance with |$G_i$−P| from maximum to minimum; selecting a neighboring interval value Gi in sequential order and automatically deleting the selected neighboring interval value Gi, and recalculating the aggregation degree D after deleting the selected neighboring interval value Gi; in response to the aggregation degree D being still greater than X4, selecting a next neighboring interval value Gi in sequential order and automatically deleting the selected neighboring interval value Gi, and recalculating the aggregation degree D after deleting the selected neighboring interval value Gi; repeating the above operations until the aggregation degree D is less than or equal to X4; obtain the mean value of the neighboring interval values Gi corresponding to the aggregation degree D being less than or equal to X4, and marking the mean value as the indirectly fixed value;

S08: obtaining a last abnormal time point before the generation timing of the replacement signals, adding the last abnormal time point to the indirectly fixed value from the S06 or S07 to obtain a time point, and marking the time point as a predicted occurrence time; and S09: in response to a time difference between the predicted occurrence time and the generation timing of the replacement signals being within a T2 duration, automatically generating a waiting signal; and after the predicted occurrence time is reached, and the T2 duration is further passed, performing the process of power charging and power discharging on the battery; in response to the time difference between the predicted occurrence time and the generation timing of the replacement signals being greater than the T2 duration, directly performing the process of power charging and power discharging on the battery.

2. The method according to claim 1, wherein the concomitant detection in the Step 2 is implemented by:
- S1: after the battery of the UPS is in a fully-charged state, detecting a real-time power of the battery and obtaining a real-time ratio of the real-time power to a power capacity of the battery, and marking the real-time ratio as a remaining ratio;
- S2: observing the remaining ratio in real time when the battery is in the un-operating state; automatically obtaining a real-time remaining ratio after observing the remaining ratio in real time continuously for X1 days, and subtracting the real-time remaining ratio from 1 to obtain an attenuation ratio; wherein X1 is a preset value;
- S3: dividing the attenuation ratio by X1 to obtain an attenuation amplitude value;
- S4: obtaining a first real-time value of the attenuation ratio in response to satisfying: the attenuation amplitude value >X2; and generating a first replacement signal in response to the first real-time value of the attenuation ratio exceeding 0.85 times α; wherein α is a preset value;
- obtaining a second real-time value of the attenuation ratio in response to satisfying: X3≤the attenuation amplitude value ≤X2; and generating a second replacement signal in response to the second real-time value of the attenuation ratio exceeding α; wherein α is a preset value; and
- obtaining a third real-time value of the attenuation ratio in response to satisfying: the attenuation amplitude value ≤X3; and generating a third replacement signal in response to the third real-time value of the attenuation ratio exceeding 1.2 times α; wherein α is a preset value, and X3 is a preset value; and
- S5: obtaining the generated replacement signals.

3. The method according to claim 1, wherein the performing the process of power charging and power discharging on the battery in the Step 4 is implemented by:
- in response to the replacement signals being generated, automatically switching a circuit controlled by the UPS to be energized by the battery; after the battery is finished in power discharging, switching the circuit controlled by the UPS to be energized by a utility grid, and simultaneously charging the battery for another time.

4. The method according to claim 1, wherein the battery comprises a plurality of battery units, and the performing the process of power charging and power discharging on the battery in the Step 4 is implemented by:
- in response to the replacement signals being generated, automatically obtaining a recent power consumption per unit time of the target device by a subject line, and labelling the recent power consumption per unit time as a subject unit consumption; wherein the subject line is supported by the UPS;
- multiplying the subject unit consumption by a set duration to obtain a minimum guaranteed power;
- in response to a total remaining power of some of the plurality of battery units in the battery being greater than or equal to the minimum guaranteed power, marking a number of the some of the plurality of battery units as a guaranteed number;
- obtaining a total number of all the plurality of battery units in the battery, subtracting the guaranteed number from the total number to obtain a value, and labelling the value as a replacement number;
- automatically switching a circuit controlled by the UPS to be energized by the battery; after some of the plurality of battery units, a number of which is the replacement number, are finished in power discharging, switching the circuit controlled by the UPS to be energized by a utility grid, and simultaneously charging the some of the plurality of battery units for another time; and
- automatically switching the circuit controlled by the UPS back to be energized by the battery, with some of the plurality of battery units, the number of which is the guaranteed number, being retained; wherein the some of the plurality of battery units comprise battery units that have been charged for another time; and performing the process of power charging and power discharging on remaining battery units in the battery, until all the plurality of battery units in the battery are subjected to the process of power charging and power discharging.

* * * * *